United States Patent [19]

Hasegawa et al.

[11] Patent Number: 4,606,242
[45] Date of Patent: Aug. 19, 1986

[54] PARKING DEVICE

[75] Inventors: Hiromi Hasegawa, Obu; Yoshinobu Iwase, Toyokawa; Yutaka Taga, Aichi; Isamu Minemoto; Takahiro Sakai, both of Toyota, all of Japan

[73] Assignees: Aisin Seiki Kabushiki Kaisha, Kariya City; Toyota Jidosha Kabushiki Kaisha, Toyota, both of Japan

[21] Appl. No.: 753,449

[22] Filed: Jul. 10, 1985

[30] Foreign Application Priority Data

Jul. 16, 1984 [JP] Japan .................. 59-106413

[51] Int. Cl.⁴ .............................. F16H 57/2
[52] U.S. Cl. .................. 74/606 R; 74/577 S
[58] Field of Search .......... 74/606 R, 532, 577 S

[56] References Cited

U.S. PATENT DOCUMENTS

| 297,130 | 4/1884 | Holcomb | 74/577 S X |
| 1,558,956 | 10/1925 | Whipple | 74/532 |
| 2,308,741 | 1/1943 | Breen | 74/606 X |
| 4,413,712 | 11/1983 | Richaud | 74/577 S X |

Primary Examiner—Harold W. Weakley
Attorney, Agent, or Firm—Burns, Doane, Swecker and Mathis

[57] ABSTRACT

A parking device for an automatic transmission system in automotive vehicles includes a parking gear connected to the engine output shaft, a pawl having one end pivotally mounted to the transmission housing and the other end pivotable towards and away from the parking gear, and a parking cam operatively associated with the pawl and movable axially of the gear for bringing the pawl into and out of engagement with the parking gear. A cam guide and a reaction supporting bracket are retained by a plurality of bolts and by at least one boss having a flat surface and affixed to the transmission housing so as to be situated on the side of the pawl opposite the parking cam.

8 Claims, 5 Drawing Figures

PARKING DEVICE

BACKGROUND OF THE INVENTION

This invention relates to a parking device provided in an automatic transmission system. More particularly, the invention relates to a parking device of the type in which a slidable cam causes a parking pawl to be lifted and engaged with a parking gear operatively associated with the output shaft.

An example of a conventional parking device is disclosed in the specification of Japanese Patent Kokai Publication No. 59-59546. The parking device, shown in FIG. 1 (Prior Art), comprises a parking gear, a pawl 15 one end of which is pivotally mounted on a transmission housing and the other end of which is mounted for sliding radially of the parking gear, and a parking cam 22 mounted for travelling axially of the gear to cause pivoting movement of the pawl 15 towards and away from the parking gear to bring the pawl 15 into and out of engagement with the parking gear. As shown in FIG. 1, a bracket 23 is fastened by bolts 28 to a pair of bosses 26', 27' on the transmission housing, not shown in FIG. 5, and is arranged to embrace the pawl 15 from the lower surface of the transmission housing. Accordingly, the bosses 26', 27' depend from the transmission housing.

SUMMARY OF THE DISCLOSURE

With the above-described arrangement of the bracket 23, the span of the bolted portions with respect to a reaction point P on the bracket 23 corresponding to a load F applied thereto from the parking gear is so great that, when the applied load F is large in magnitude, flexure of the bracket 23 increases considerably. This detracts from parking performance and causes a tensile force to act on the bolts 28, thereby having a deleterious effect upon the mechanical strength of the bolts or bracket. Such an increase in the load F is caused when the automatic transmission is suddenly shifted to parking while the vehicle is travelling, or when the vehicle skids to produce an impact torque.

Accordingly, an object of the present invention is to provide a parking device devoid of the aforementioned deficiencies of the prior art.

Another object of the present invention is to provide a parking device capable of being easily mounted and in which the bracket is supported with improved rigidity and stability.

According to the present invention, the foregoing objects are attained by providing a parking device of the above-described type, characterized in that a cam guide for a parking cam and a reaction supporting bracket are held in position by a plurality of bolts and by at least one boss having a flat supporting surface. The boss is mounted on the transmission housing so as to be situated on the side of the pawl opposite the parking cam. Such an arrangement allows the reaction supporting bracket to be supported from below by the boss affixed to or otherwise provided on the transmission housing in such a manner that a tensile force no longer acts upon the mounting bolts of the bracket. This is desirable from the viewpoint of maintaining the strength of the bolts. The component parts of the parking device are arranged so as not to interfere with the parking mechanism, and the bracket can be supported over a wide surface area to enable a reduction in the flexure of the bracket and to increase the strength of the device. In addition, the assembling operation is facilitated because the bracket can be mounted on and bolted to the upper surface of the boss or bosses with improved stability.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
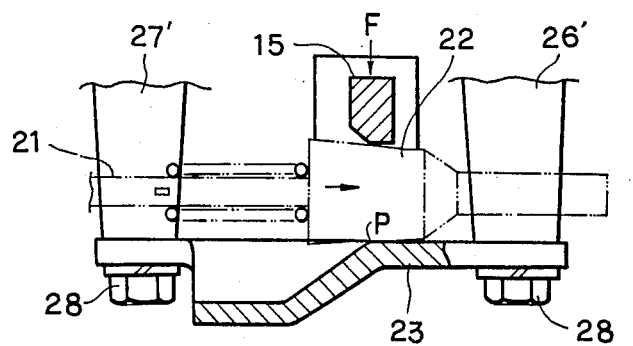
FIG. 1 is a side view, partially in section, illustrating a principal portion of a parking device according to the prior art.
Figure 3:
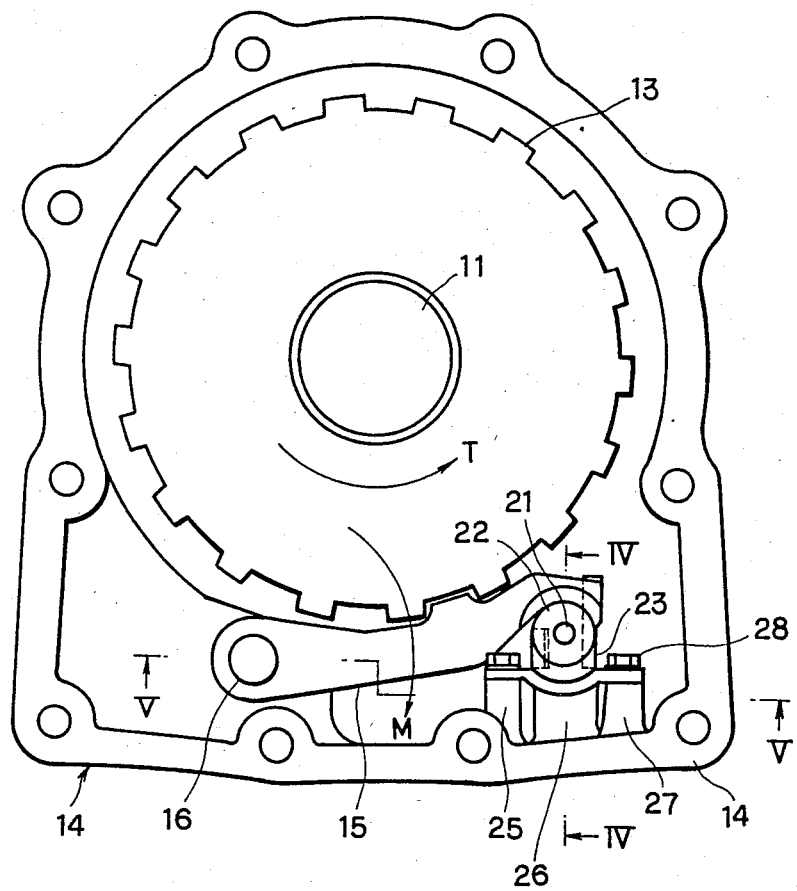
FIG. 3 is a sectional view taken along line III—III of FIG. 2 and showing an embodiment of a parking device according to the present invention.
Figure 2:
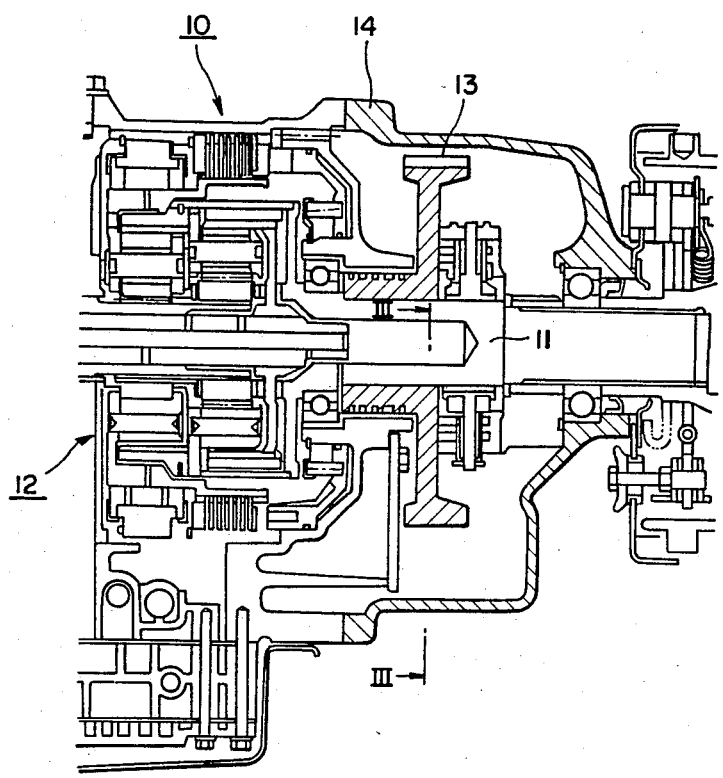
FIG. 2 is a sectional view showing an automatic transmission to which the parking device of the present invention is applied.

Referring to FIG. 2 showing an automatic transmission to which the parking device of the present invention is applied, a shifting mechanism 12 and a parking gear 13 are mounted on a main shaft 11 of a transmission 10. These components are contained in a transmission housing 14. As best shown in FIG. 3, an elongated pawl 15 is mounted between the parking gear 13 and the lower wall of the transmission housing 14. One end of the pawl 15 is pivotally mounted on the housing 14 by a pivot pin 16 while the other end of the pawl is mounted for pivotal radial movement towards and away from the parking gear 13. Since the pawl 15 is normally biased in a direction away from the parking gear 13 by a spring 17 coiled about the pivot pin 16, as shown in FIG. 5, the pawl 15 normally is not engaged with the parking gear 13 so as to permit free rotation of the parking gear 13 and, hence, of the main shaft 11. However, the pawl 15 is capable of being raised against the force of the spring 17 by an actuating mechanism 20 shown in detail in FIG. 4 so as to mesh with the parking gear 13 as shown in FIG. 3, thus establishing a parking condition. The actuating mechanism 20 is composed of a rod 21 operatively associated with a range shift lever, not shown, the parking cam 22 provided on the distal end of the rod 21, the bracket 23, having a stepped configuration, supporting the cam 22, and a guide member 24 for guiding the pawl 15. The supporting bracket 23 is a tubular member into which the parking cam 22 can be introduced. The upper part of the bracket 23 is formed to include the pawl guide member 24. The supporting bracket 23 is mounted on bosses 25, 26, 27 affixed to or integrally provided on the transmission housing 14 on the side of the pawl 15 opposite the cam 22. In the illustrated embodiment, the upper part of the boss 26 presents a flat surface and the bracket 23 simply rests on the boss 26. However, the bracket 23 is secured to the other bosses 25, 27 by bolts 28.

Figure 4:
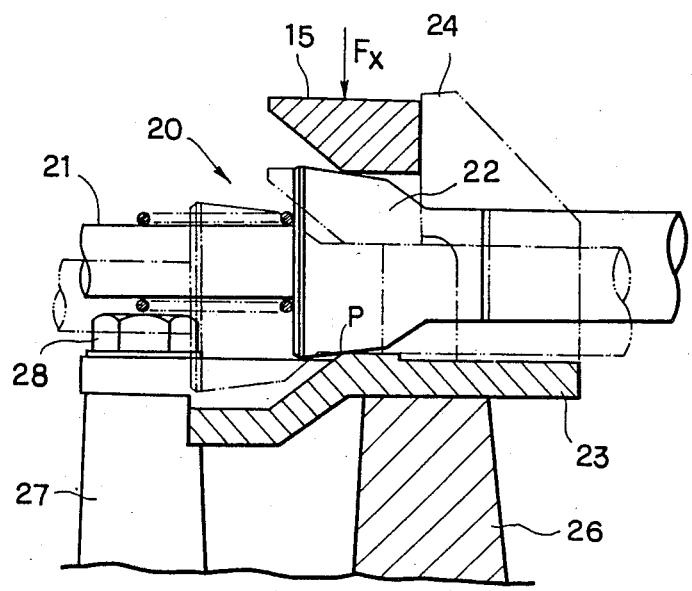
FIG. 4 is a sectional view taken along line IV—IV of FIG. 3 and showing an actuating mechanism of the parking device.
Figure 5:
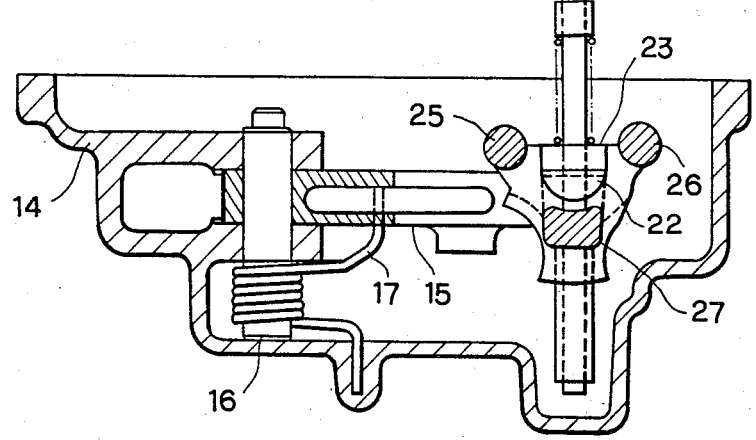
FIG. 5 is a sectional view taken along line V—V of FIG. 3.

When the transmission is set to a position other than parking, the rod 21 and the parking cam 22 are in the positions shown by the phantom lines in FIG. 4. When the transmission is shifted to the parking range by a manual operation performed by the driver, the rod 21 and the cam 22 are shifted to a position shown by the solid line in FIG. 4. This causes the pawl 15 to be raised from its lower position shown in phantom in FIG. 4 to the upper solid-line position so as to be engaged with the parking gear 13, as depicted in FIG. 3.

During such engagement between the pawl 15 and parking gear 13 establish the parking condition, a wheel-lock torque T is transmitted from the main shaft 11 of the transmission to the parking gear 13 in such a manner that a reaction momemt M produced about the pin 16 is applied to the pawl 15, which is meshing with the parking gear 13. A load Fx produced by the reaction moment M (FIG. 4) causes the bracket 23 to be pressed strongly against the boss 26 of the housing 14 through the parking cam 22. The larger the total weight of the vehicle, the larger is the magnitude of the load F. The load Fx becomes particularly large with a vehicle that carries a great load, such as a truck.

It should be noted that although the bolts 28 are mounted in a plane normal to the axial direction of the shaft 11, these bolts 28 may be arranged axially of the shaft 11 provided that a bent portion, not shown, is formed in the bracket 23 for abutting against the sides of the bosses 25, 27, and in such a manner that the bent portion is secured by the bolts 25, 27 to the transmission housing 14.

According to the parking device of the present invention, the boss seats can be situated at a closer position to the load application point P so that the bracket can be supported with greater strength and rigidity than that possible with the conventional device.

Also, since the screw-tightened portions can be provided solely on the open side of the transmission housing 14, the bracket 23 can be assembled on the housing 14 even after the pawl 15 is assembled in position in the housing, thereby enabling the pawl to be guided more accurately. This is desirable especially when the pawl guide 24 of the bracket 23 is assembled while being abutted against the pawl 15.

It is preferred that the three bosses (25-27) are disposed at each apex of a triangular boss-disposition. The minimum requirement is the existence of the main boss 27 in the vicinity of the reaction point P of the bracket against the pawl 15. It is also preferred that the flat supporting surface extends substantially perpendicular with the pivoting direction of the pawl as such arrangement can provide a high stability.

As many apparently widely different embodiments of the present invention can be made without departing from the spirit thereof and scope as defined in the appended claims, it is to understand that the invention is not limited to the specific embodiments thereof herein disclosed.

What we claim is:

1. A parking device comprising:
    a parking gear;
    a pawl having one end pivotally mounted on a transmission housing and the other end arranged to be pivoted radially towards and away from said parking gear;
    a parking cam arranged for sliding against said pawl and movable axially of said parking gear for pivoting said pawl realtive to said parking gear for bringing said pawl into and out of engagement with said parking gear;
    a boss having a flat supporting surface and provided on the transmission housing so as to be situated on a side of said pawl opposite said parking cam; and
    a plurality of fastening bolts;
    said boss and said plurality of bolts retaining a cam guide for said parking cam and a reaction supporting bracket in position, said reaction supporting bracket being received on the flat supporting surface of said boss.

2. The parking device according to claim 1, wherein said flat supporting surface extends substantially perpendicular with the pivoting direction of said pawl.

3. The parking device according to claim 1, further comprising at least an additional boss having a flat supporting surface disposed parallel with said flat supporting surface and disposed on the transmission housing so as to further receive said reaction supporting bracket.

4. The parking device according to claim 3, wherein said additional boss includes a threaded bore to receive said bolt.

5. The parking device according to claim 1, wherein said boss is disposed in the vicinity of the reaction point between said reaction supporting bracket against said parking cam.

6. The parking device according to claim 3, further comprising a pair of additional bosses, the three bosses being disposed at each apex of a triangular boss-disposition.

7. The parking device according to claim 1, further comprising resilient means for normally biasing said pawl in a direction away from said parking gear.

8. The parking device according to claim 2, further comprising actuating means for urging said pawl against a force applied by said resilient means to mesh said pawl with said parking gear establish a parking condition.

* * * * *